United States Patent [19]

Bernstein

[11] Patent Number: 5,335,210

[45] Date of Patent: * Aug. 2, 1994

[54] INTEGRATED LIQUID CRYSTAL ACOUSTIC TRANSDUCER

[75] Inventor: Jonathan Bernstein, Medfield, Mass.

[73] Assignee: The Charles Stark Draper Laboratory Inc., Cambridge, Mass.

[*] Notice: The portion of the term of this patent subsequent to Sep. 8, 2009 has been disclaimed.

[21] Appl. No.: 968,342

[22] Filed: Oct. 28, 1992

[51] Int. Cl.⁵ .................................. H04R 19/00
[52] U.S. Cl. ......................... 367/163; 367/181
[58] Field of Search ............ 367/163, 181, 191; 381/174, 191; 29/25.42

[56] References Cited

U.S. PATENT DOCUMENTS

| | | | |
|---|---|---|---|
| 4,037,062 | 7/1977 | Fergason | 381/174 |
| 4,233,477 | 11/1980 | Rice et al. | 381/191 |
| 4,356,422 | 10/1982 | van Maanen | 310/322 |
| 4,652,086 | 3/1987 | Sandhu | 359/46 |
| 5,146,435 | 9/1992 | Bernstein | 367/181 |

Primary Examiner—Daniel T. Pihulic
Attorney, Agent, or Firm—Joseph S. Iandiorio; Kirk Teska

[57] ABSTRACT

An integrated liquid crystal acoustic transducer includes a substrate chip having a through hole; a movable plate electrode; means for resiliently mounting the movable plate electrode across the hole in the substrate chip; a perforated electrode spaced from the movable plate electrode and mounted across the hole in the substrate chip; and a liquid crystal medium, disposed between the electrodes, whose polarization vector orientation changes in response to electrical and acoustic input to reciprocally convert between electric and acoustic energy.

20 Claims, 4 Drawing Sheets

INTEGRATED LIQUID CRYSTAL ACOUSTIC TRANSDUCER

FIELD OF INVENTION

This invention relates to an integrated liquid crystal acoustic transducer, and more particularly to such a transducer useful as a microphone, hydrophone or loudspeaker for example.

BACKGROUND OF INVENTION

There are a number of techniques for transducing between acoustic and electrical energy, including solid ferroelectrics such as PZT (lead-zirconium-titanate), piezoelectric crystals such as quartz, fiber optic sensors, magnetostrictive devices, condenser or capacitive microphones filled with air for example, moving coil magnetic sensors and speakers, carbon powder microphones and speakers, and electric microphones and loudspeakers. Generally, these devices are inherently large and require bulky coils of wire or fiber optic cable, and are difficult to miniaturize. Carbon powder microphones are nonlinear and noisy. Magnetostrictive devices require a large magnet to operate. Ferroelectrics and piezoelectrics are difficult to miniaturize to the extent necessary to integrate them into an integrated sensor or array. Condenser microphones can be manufactured as integrated sensors on silicon chips, but these small sensors are filled with a low dielectric fluid such as air or silicone oil, giving them a small output capacitance. This small output capacitance necessitates a high input impedance and low noise buffer amplifier on the same chip.

SUMMARY OF INVENTION

It is therefore an object of this invention to provide an improved liquid crystal acoustic transducer.

It is a further object of this invention to provide such an improved liquid crystal acoustic transducer which relies on the shift in orientation of the polarization vectors of the liquid crystal medium to transduce between electrical and acoustic energy.

It is a further object of this invention to provide such an improved liquid crystal acoustic transducer which is formed wholly on a single chip.

It is a further object of this invention to provide such an improved liquid crystal acoustic transducer which is smaller, more compact, and simpler.

It is a further object of this invention to provide such an improved liquid crystal acoustic transducer which can operate with lower bias voltage and in some cases without a bias voltage.

It is a further object of this invention to provide such an improved liquid crystal acoustic transducer which can be formed with an integrated electronic circuit all on the same chip.

The invention results from the realization that a truly sensitive yet small, simple and compact liquid crystal acoustic transducer can be effected by mounting the movable and perforated electrodes across a hole in a substrate chip and disposing a liquid crystal medium between the electrodes so that an acoustic or electric input causes a change in the polarization vector orientation of the liquid crystal medium resulting in a concomitant change in the electric or acoustic output, respectively.

This invention features an integrated liquid crystal acoustic transducer having a substrate chip with a through hole. There is a movable plate electrode and means for resiliently mounting the movable plate electrode across the hole in the substrate chip. There is a perforated electrode spaced from the movable plate electrode and mounted across the hole in the substrate chip. A liquid crystal medium is disposed between the electrodes and the polarization vector orientation of that liquid crystal medium changes in response to electrical and acoustic input to reciprocally convert between electric and acoustic energy. When the device is used as a microphone or hydrophone, the liquid crystal medium polarization vector orientation changes in response to an acoustic input to produce a change in electrical output representative of the acoustic input. When the device is operated as a loudspeaker or ultrasonic projector, the liquid crystal medium polarization vector orientation changes in response to an electrical input to produce a change in acoustic output representative of the electrical input.

In a preferred embodiment the liquid crystal may be a ferroelectric, smectic, nematic or cholesteric material. The means for resiliently mounting may include spring means interconnecting the substrate chip and the movable plate electrode. The movable plate electrode and the substrate chip may be integrally formed and the means for resiliently mounting may include a flexible section. The movable electrode may be diaphragm. The substrate chip may be silicon. The movable plate and the means for resiliently mounting may be made of silicon and may be integral with the silicon chip. The movable plate electrode and the means for resiliently mounting may be made of silicon and may be integral with the silicon chip. The movable plate electrode may be made of metal. The perforated electrode may be integral with the substrate chip and may be made of silicon or polycrystalline silicon. The substrate chip may include an integrated buffer amplifier circuit interconnected with the electrodes.

DISCLOSURE OF PREFERRED EMBODIMENT

Other objects, features and advantages will occur to those skilled in the art from the following description of a preferred embodiment and the accompanying drawings, in which.

The integrated liquid crystal acoustic transducer of this invention may be accomplished using a substrate chip having a through-hole. The substrate chip can be silicon preferably, or germanium, gallium arsenide, or any other semiconductor, ceramic or metal which is suitable. There is a movable plate electrode and means for resiliently mounting the movable plate electrode across the hole in the silicon chip. There is also a perforated electrode spaced from the movable plate electrode and mounted across the hole in the silicon chip. The perforated electrode may be made of silicon, polycrystalline silicon, a metal, or any other suitable material. It may be mounted at the mouth of the hole, inside the hole, or bridging the hole. The movable plate electrode may similarly be mounted in the hole, across the mouth of the hole, or bridging the hole, and may be made of silicon, polycrystalline silicon, a metal, or any other suitable material. Either the movable electrode or tile perforated electrode may be constructed from a composite of two or more layers, at least one of which is conductive, such as a silicon nitride membrane with a metal coating. The movable electrode may be a diaphragm. The silicon chip may also include buffer electronics associated with the transducer itself. The transducer is typically installed in a sealed housing immersed in a liquid crystal medium so that the liquid crystal medium at least occupies the space between the two electrodes. The device operates as a function of the polarization vector orientation which changes in response to an electrical or acoustical input to reciprocally convert between electrical or acoustic energy, respectively. That is, an acoustic input changes the orientation of the polarization vector which is detected as a charge or voltage output. Conversely, an electrical input changes the orientation of the polarization vector which causes a motion of the movable electrode resulting in an acoustic output. The liquid crystal medium may be a ferroelectric, smectic, nematic or cholesteric material. If it is a ferroelectric material, an initial bias or poling voltage is applied but is no longer needed after the liquid crystal medium has been poled. In the cases of smectic, nematic and cholesteric materials, a constant bias is necessary to properly orient the liquid crystal molecules. The movable electrode may be connected to the silicon chip by means of separate springs or flexures or may be interconnected by some other resilient means such as a thin or more flexible portion of the silicon chip or of the electrode material, and in fact the electrode may be made of the same material and even may be made integral with the silicon. Such devices find use as microphones, loudspeakers, hydrophones, integrated acoustic sensors, medical ultrasound imaging sensors, stethoscopes, fetal heart monitors, and in many other applications.

Figure 1:
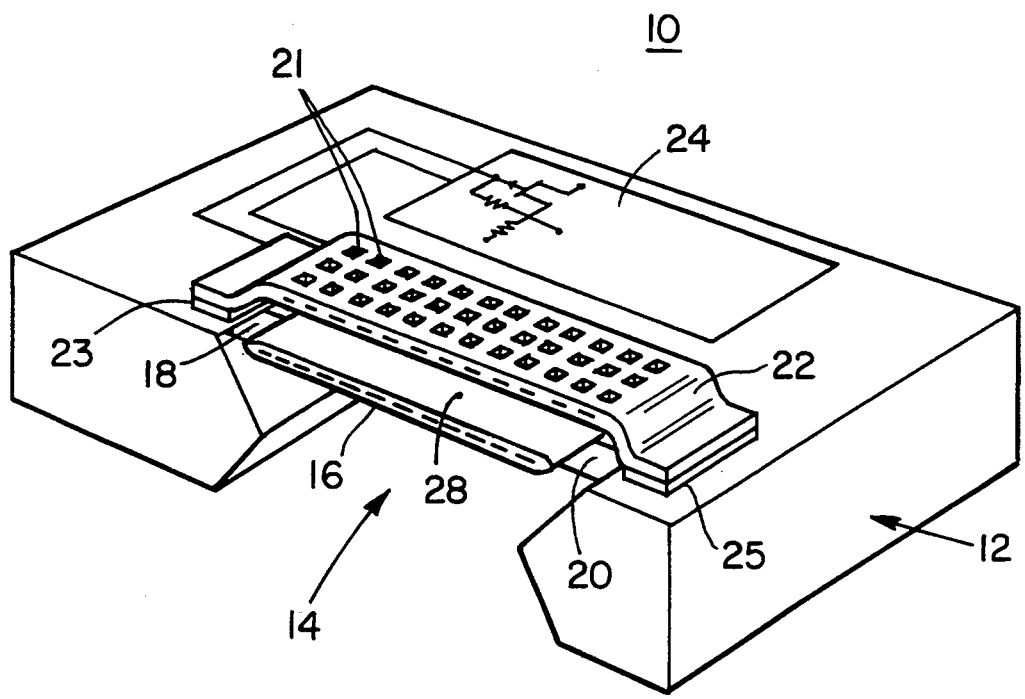
FIG. 1 is a three-dimensional diagrammatic view of an integrated silicon chip liquid crystal acoustic transducer according to this invention.
Figure 2:
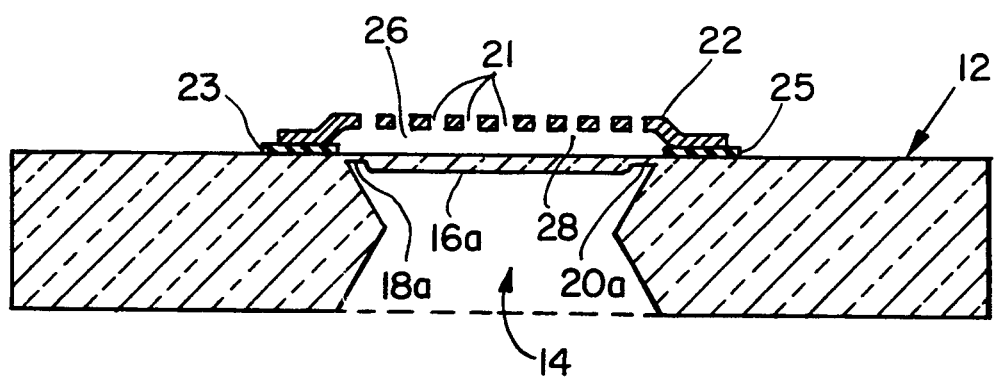
FIG. 2 is a side sectional view of the transducer of FIG. 1.

There is shown in FIG. 1 an integrated silicon liquid crystal acoustic transducer 10 according to this invention including a silicon chip 12 having a hole 14 across which is mounted movable electrode 16 resiliently suspended by means of springs 18 and 20. A perforated electrode 22 having perforations 21 is also mounted across hole 14 in spaced relationship to movable electrode 16. Perforated electrode 22 is mounted to silicon chip 12 by means of dielectric insulating pads 23, 25. In FIG. 1 the fixed electrode 22 is mounted in a bridge configuration while the movable electrode 16 is mounted across the mouth of hole 14. This is not a necessary limitation as the arrangement could be reversed. Also included on silicon chip 12 is an integrated circuit 24 which includes the electronics associated with electrodes 16 and 22. A liquid crystal material 26 such as a ferroelectric, smectic, nematic or cholesteric material is disposed in the gap 28 between electrodes 16 and 22. 10 Although in FIG. 1 separate flexures or springs 18 and 20 are shown for resiliently supporting movable electrode 16, this is not a necessary limitation of the invention. For example, movable electrode 16a, FIG. 2, of transducer 10a may be mounted by thinned or otherwise weakened sections 18a land 20a which may be made integral with silicon chip 12 and in fact may be made of silicon and be a part of the silicon chip itself. Alternatively, sections 18a and 20a may be a form of membrane or corrugated membrane to provide the required flexibility or the movable electrode may be a diaphragm.

Figure 3:
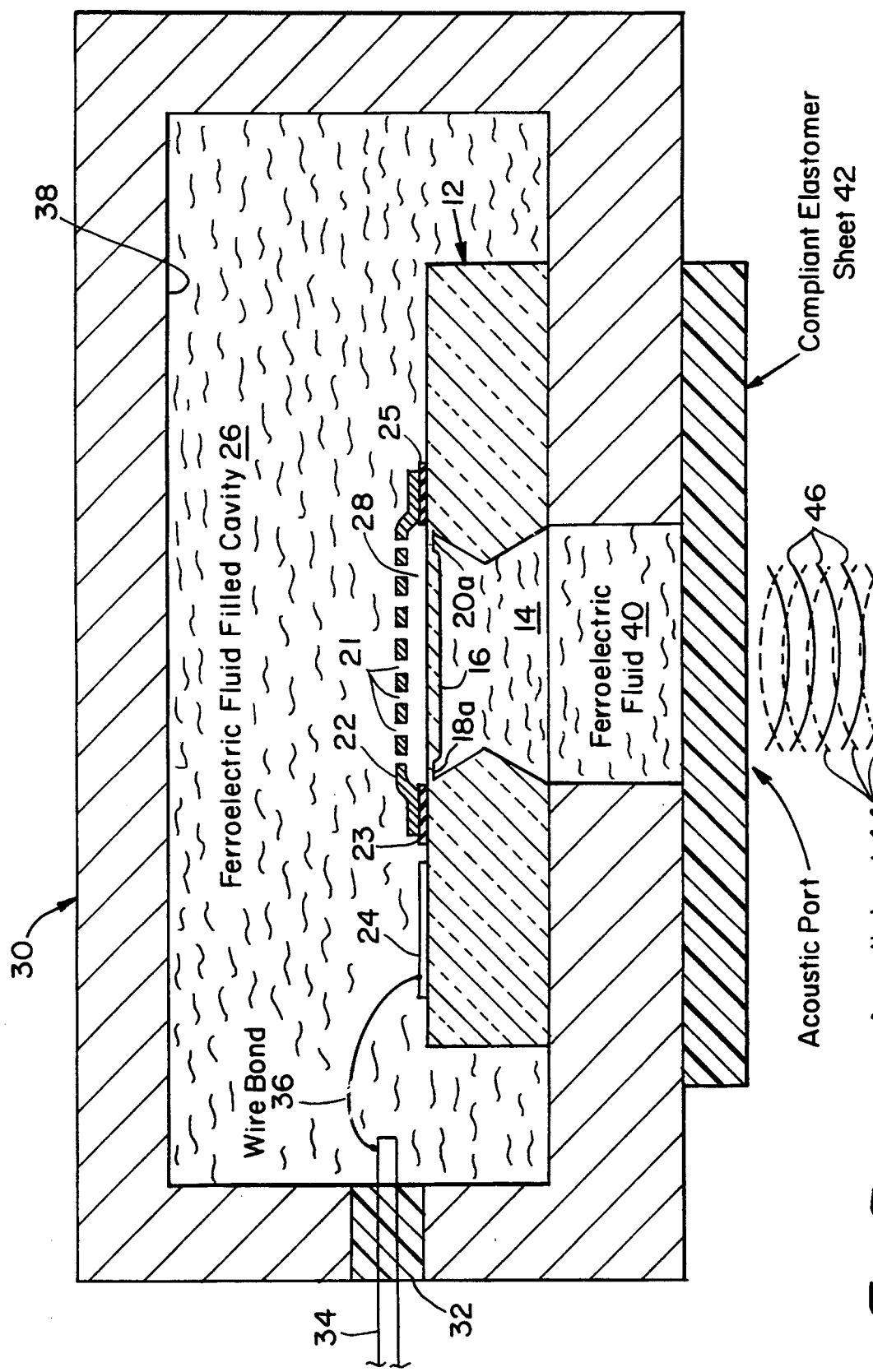
FIG. 3 is a view of the transducer shown in FIG. 2 included in a sealed fluid-filled housing.

The liquid crystal medium is typically used to immerse the entire transducer in a sealed chamber, as shown in FIG. 3, where rigid housing 30 has a sealed port 32 through which enter electrical leads 34 which are wire-bonded using wire 36 to the integrated circuit 24 on silicon chip 12. In this case the ferroelectric fluid 26 fills the entire cavity 38 formed inside of housing 30, the hole 14 in silicon chip 12, the gap 28 between the electrodes, and the aperture 40 in the wall of housing 30 covered by compliant elastomer sheet 42. An acoustic input as indicated by input acoustic wavefronts 44 moves movable electrode 16 creating a stress so that the orientation of the polarization vectors of the liquid crystal medium between electrodes 16 and 22 is changed, resulting in an electrical output such as a change in voltage or charge to integrated circuit 24. Conversely, if a voltage is applied through electrical leads 34 and wires 36, a change in the orientation of the polarization vectors of the liquid crystal medium in gap 28 creates a force causing a movement of the movable electrode 16 that results in the generation of an output acoustic wave 46 which is produced at aperture 40 through elastomeric sheet 42.

Figure 4:
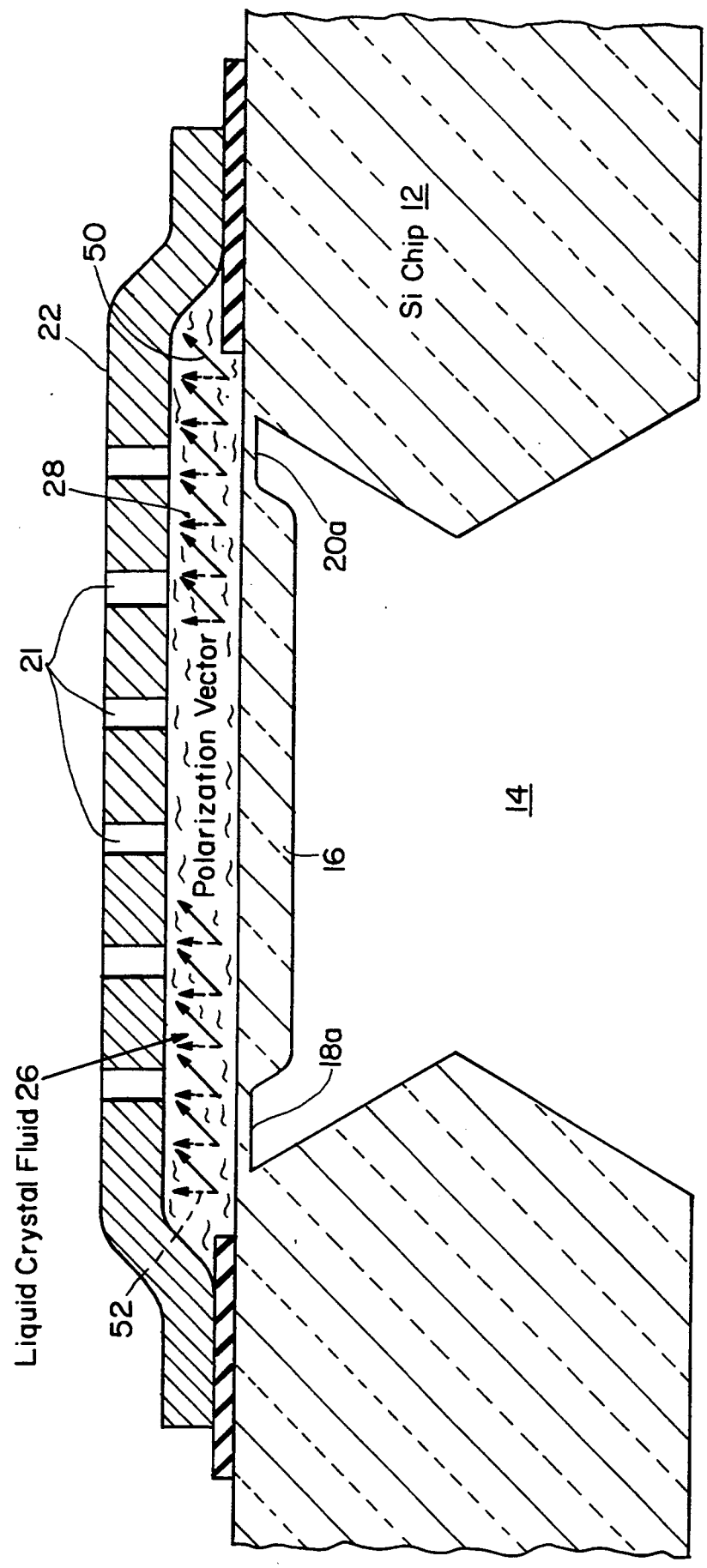
FIG. 4 is a schematic diagram of a portion of the transducer of FIGS. 1-3 showing the polarization vector orientation of the liquid crystal medium between the electrode plates.

The orientation of the polarization vectors is shown by the full line vector arrows 50 in FIG. 4. This may be the quiescent state of the molecules in the liquid crystal medium which occurs under the normal bias as applied to smectic, nematic or cholesteric liquid crystal mediums, or which occurs in a ferroelectric liquid crystal medium after having been once poled, but without a continuing bias. Upon the input of an electrical signal or an acoustic signal, these polarization vectors would then change their orientation to the vertical vector arrows 52 shown in phantom. When operating as a speaker or loudspeaker, this change in orientation causes a motion of movable plate electrode 16, resulting in an acoustic output. When operating as a microphone or hydrophone, the movement of movable plate 16 causes a change in orientation which results in a change in the electrical output, such as voltage or charge, which can be detected.

Figure 5:
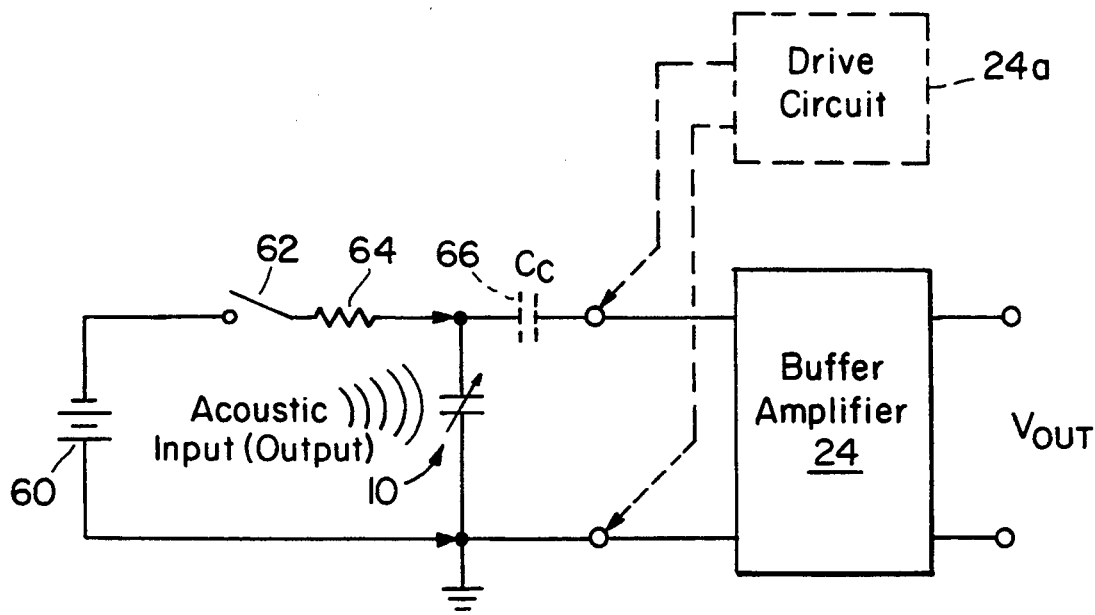
FIG. 5 is a schematic diagram of an electrical circuit for operating the transducer of FIG. 1 located on the same silicon chip as the transducer of FIG. 1.
Figure 6:
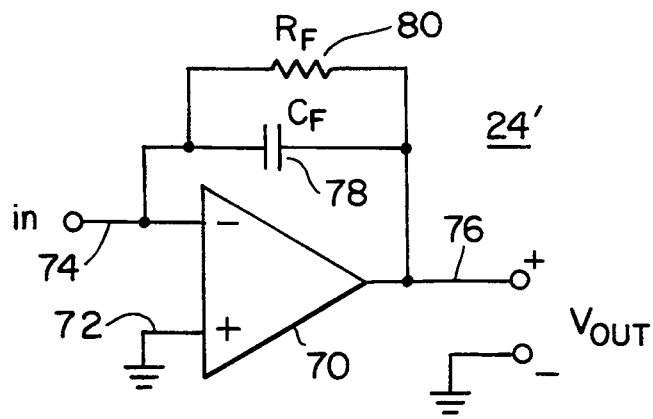
FIG. 6 is a schematic diagram of one form of buffer amplifier as shown in FIG. 5.
Figure 7:
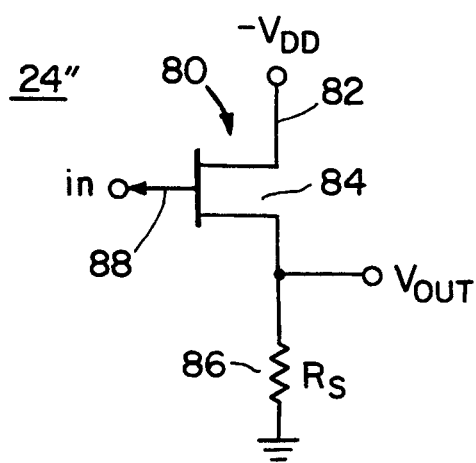
FIG. 7 is a second form of buffer amplifier which may be used in FIG. 5.

A simple circuit for operating transducer 10 is shown in FIG. 5, where a biasing or poling voltage represented by battery 60 is connected through switch 62 and charging resistor 64 to transducer 10. In the case of a ferroelectric liquid crystal medium, the switch 62 need be closed and then opened just once to pole the molecules in the ferroelectric medium which will then stay permanently biased in a particular orientation. This poling operation may be carried out while the temperature of the transducer is lowered from above the clearing point of the ferroelectric to below the clearing point. If other materials such as smectic, nematic or cholesteric are used, switch 62 must remain closed continuously in order to maintain the bias that keeps the liquid crystal molecules properly oriented. If a liquid crystal medium other than the ferroelectric medium is used, a coupling capacitor 66 would also be employed. When transducer 10 receives an acoustic input, the change in the voltage or charge output is sensed by buffer amplifier 24 and a suitable voltage or other output signal is provided. Alternatively, a drive circuit 24a may be used to provide a voltage input to transducer 10 so that an acoustic output is generated. Buffer amplifier 24 may be implemented as shown in FIG. 6, where the amplifier 24' includes an op amp 70 having its positive input 72 connected to ground and its negative input 74 connected to the output 76 through feedback capacitor 78 in parallel with feedback resistor 80. Alternatively, buffer amplifier 24", FIG. 7, may include a field effect transistor 80 having its drain terminal 82 connected to $-V_{dd}$ and its source terminal 84 connected through a source resistor 86 to ground. The input signal is supplied at the gate terminal 88 and the output is taken from the source terminal.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. An integrated liquid crystal acoustic transducer, comprising:
   a substrate chip having a through hole;
   a movable plate electrode;
   means for resiliently mounting said movable plate electrode across said hole in said substrate chip;
   a perforated electrode spaced from said movable plate electrode and mounted across said hole in said substrate chip; and
   a liquid crystal medium, disposed between said electrodes, whose polarization vector orientation changes in response to electrical and acoustic input to reciprocally convert between electric and acoustic energy.

2. The integrated liquid crystal acoustic transducer of claim 1 in which the liquid crystal is ferroelectric.

3. The integrated liquid crystal acoustic transducer of claim 1 in which the liquid crystal is smectic.

4. The integrated liquid crystal acoustic transducer of claim 1 in which the liquid crystal is nematic.

5. The integrated liquid crystal acoustic transducer of claim 1 in which the liquid crystal is cholesteric.

6. The integrated liquid crystal acoustic transducer of claim 1 in which said means for resiliently mounting includes spring means interconnecting said substrate chip and said movable plate electrode.

7. The integrated liquid crystal acoustic transducer of claim 1 in which said movable plate electrode and said substrate chip are integrally formed and said means for resiliently mounting includes a flexible section.

8. The integrated liquid crystal acoustic transducer of claim 1 in which said substrate chip is silicon.

9. The integrated liquid crystal acoustic transducer of claim 8 in which said movable plate element and said means for resilient mounting are made of silicon and are integral with said silicon chip.

10. The integrated liquid crystal acoustic transducer of claim 1 in which said movable plate electrode is made of metal.

11. The integrated liquid crystal acoustic transducer of claim 1 in which said movable plate electrode is a composite of conducting material and non-conducting material.

12. The integrated liquid crystal acoustic transducer of claim 1 in which said perforated electrode is integral with said substrate chip.

13. The integrated liquid crystal acoustic transducer of claim 1 in which said perforated electrode is made of silicon.

14. The integrated liquid crystal acoustic transducer of claim 1 in which said perforated electrode is made of polycrystalline silicon.

15. The integrated liquid crystal acoustic transducer of claim 1 in which said perforated electrode is made of metal.

16. The integrated liquid crystal acoustic transducer of claim 1 in which said movable electrode is a diaphragm.

17. The integrated liquid crystal acoustic transducer of claim 1 in which said substrate chip includes an integrated buffer amplifier circuit interconnected with said electrodes.

18. An integrated liquid crystal acoustic microphone comprising:
   a substrate chip having a through hole;
   a movable plate electrode;
   means for resiliently mounting said movable plate electrode across said hole in said substrate chip;
   a perforated electrode spaced from said movable plate electrode and mounted across said hole in said substrate chip; and
   a liquid crystal medium, disposed between said electrodes, whose polarization vector orientation changes in response to an acoustic input producing a change in electrical output representative of the acoustic input.

19. An integrated liquid crystal acoustic hydrophone comprising:
   a substrate chip having a through hole;
   a movable plate electrode;
   means for resiliently mounting said movable plate electrode across said hole in said substrate chip;
   a perforated electrode spaced from said movable plate electrode and mounted across said hole in said substrate chip; and
   a liquid crystal medium, disposed between said electrodes, whose polarization vector orientation changes in response to an acoustic input producing a change in electrical output representative of the acoustic input.

20. An integrated liquid crystal acoustic loudspeaker comprising:
   a substrate chip having a through hole;
   a movable plate electrode;
   means for resiliently mounting said movable plate electrode across said hole in said substrate chip;
   a perforated electrode spaced from said movable plate electrode and mounted across said hole in said substrate chip; and
   a liquid crystal medium, disposed between said electrodes, whose polarization vector orientation changes in response to an electrical input producing a change in acoustic output representative of the electrical input.

* * * * *